Sept. 22, 1964 J. L. BROWN 3,150,249
DRIVE SYSTEM ON STEEL DRUM SEAM WELDING MACHINE
Filed Aug. 29, 1963 3 Sheets-Sheet 1
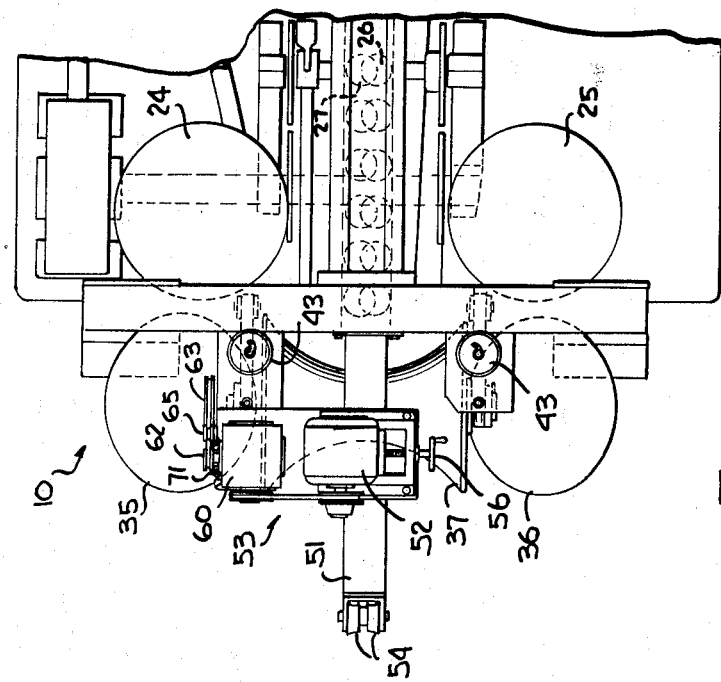
INVENTOR
JAMES L. BROWN
BY
*Marm, Porter, Willis & Stewart*
ATTORNEYS Sept. 22, 1964          J. L. BROWN          3,150,249

DRIVE SYSTEM ON STEEL DRUM SEAM WELDING MACHINE

Filed Aug. 29, 1963          3 Sheets-Sheet 2

INVENTOR
JAMES L. BROWN

BY
ATTORNEYS

INVENTOR
JAMES L. BROWN

3,150,249
DRIVE SYSTEM ON STEEL DRUM SEAM WELDING MACHINE

James L. Brown, Midland, Mich., assignor to Continental Can Company, Inc., New York, N.Y., a corporation of New York
Filed Aug. 29, 1963, Ser. No. 305,287
10 Claims. (Cl. 219—64)

This invention relates to a welding machine for steel drum seams and more particularly to a new drive system for moving drums through a welding station.

The invention is primarily an improvement of a known type of welding machine such as the machine which is disclosed in the patent to H. C. Cogan, Patent No. 2,549,173, dated April 17, 1951. It is to be understood, however, that the invention is not necessarily limited for use with the particular welding machine disclosed in this patent but may be used with other types of welding machines.

In standard types of welding machines for welding the longitudinal lap seam of large steel drums, i.e., oil drums, it has been customary to provide upper and lower electrode rollers which cooperate to form the welded seam. The electrode rollers were rotatably driven and, besides functioning as electrodes, were also used as the sole drive means to drive drum bodies through the welding station. In order to prevent slipping of the electrode rollers during the driving of the drum bodies it was necessary to urge the rollers toward each other with considerable force. With such a welding machine, it was found that the electrode rollers had to be dressed after welding a certain number of drum bodies. The dressing operation required, in addition to the labor costs involved, considerable "down time" during which time the machine was being serviced. Even more significant was the fact that the electrode rollers were dressed down about ⅛" per dressing which necessitated frequent replacement of the electrode rollers. The electrode rollers are quite expensive and their replacement resulted in a considerable expenditure.

Such previously known types of welding machines have been provided with a plurality of idler hour-glass forming rolls at the welding station to cause the drums to conform to a predetermined shape. It has been customary to provide three forming rolls with axes angularly disposed to each other, an uppermost one of the forming rolls having its axis horizontally disposed and the two remaining forming rolls having their axes converging downwardly with respect to each other.

It is an object of this invention to provide a new drive system for seam welding machines, which drive system greatly reduces the wear on the electrode rollers and, therefore, greatly increases the number of drum bodies which can be welded before it is necessary to dress the electrode rollers.

Another object of this invention is to provide a means for driving the uppermost hour-glass forming roll at a net effective peripheral speed equal to or slightly greater than the speed of the electrode rollers.

Another object of this invention is to provide an improvement for a seam welding machine of the type comprising a pair of electrode rollers, an hour-glass forming roll, and means mounting the forming roll for pivotal movement toward and away from the electrode rollers, by providing variable speed drive means operatively connected to the forming roll.

Another object of this invention is to provide the hour-glass forming roll with variable speed drive means comprising a constant speed motor, a speed reducing means, a variable diameter pulley operatively connected to the constant speed motor, first belt means operatively connecting the pulley to the speed reducing means, second belt means operatively connecting the speed reducing means to the hour-glass forming roll, and means cooperating with the second belt means to compensate for the pivotal movement of the forming roll.

Another object of this invention is to provide the second belt means with tensioning means which comprise a tensioning roller, means mounting the tensioning roller, and spring means urging the tensioning roller against the second belt means to prevent slack from developing in the second belt means during the pivotal movement of the hour glass forming roll.

A further object of this invention is to provide a pivotally mounted axle support, and axle rotatably journaled in the axle support, stop means to limit pivotal movement of the axle support, means connecting the forming roll to the axle for rotation therewith, and drive means operatively connected to the axle for rotating the axle and the forming roll.

With the above and other objects in view that will hereinafter appear, the nature of the invention will be more clearly understood by reference to the following detailed description, the appended claimed subject matter and the several views illustrated in the accompanying drawings.

In the drawings:

FIGURE 1 is a fragmentary side elevation view of a known type of seam welding machine that has been modified in accordance with the present invention.

FIGURE 2 is a fragmentary plan view of the improved seam welding machine.

Figure 3:
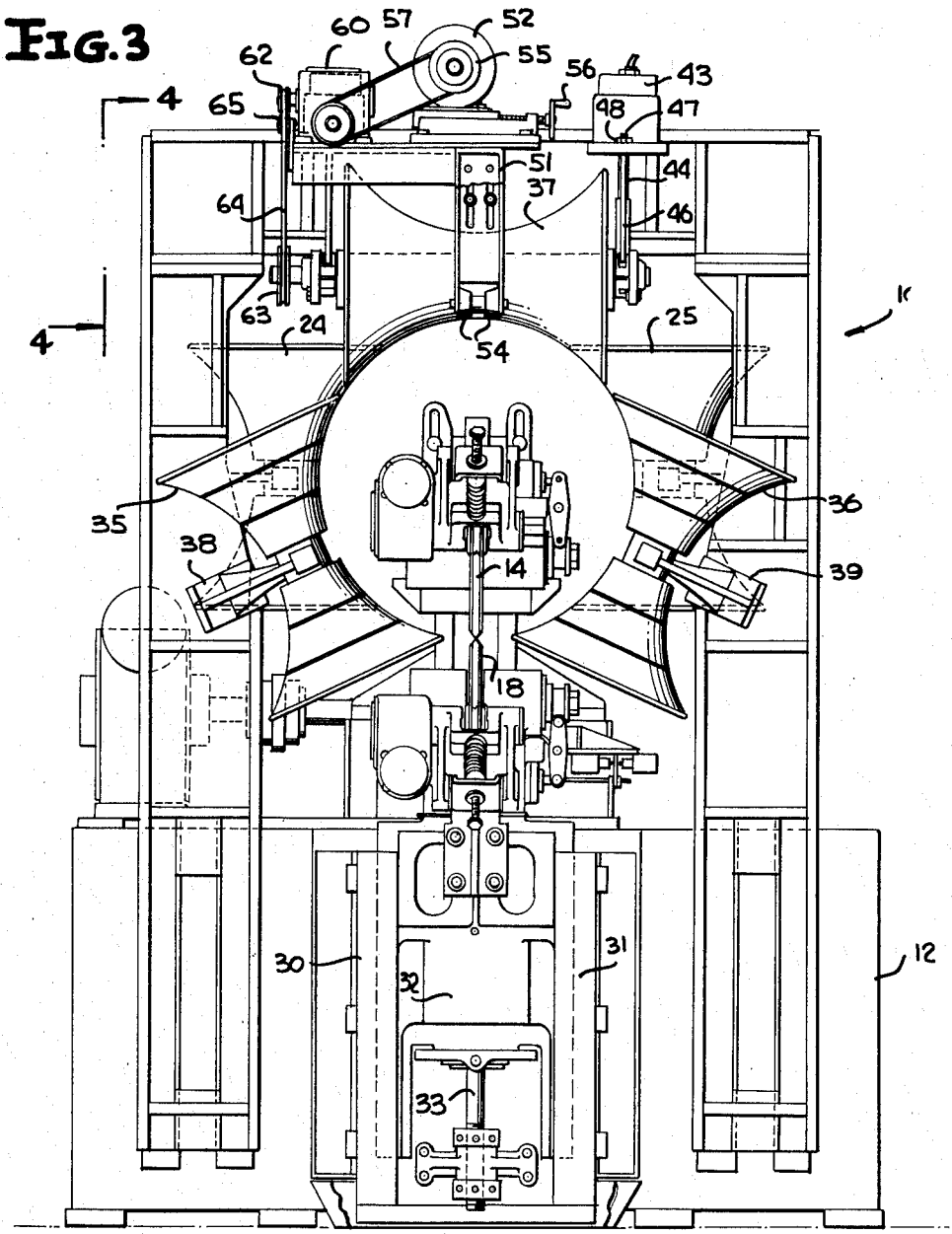
FIGURE 3 is an end elevation looking at the leftward end of the machine as appearing in FIGURE 1, and illustrates the driving means for the uppermost hour-glass forming roll.
Figure 4:
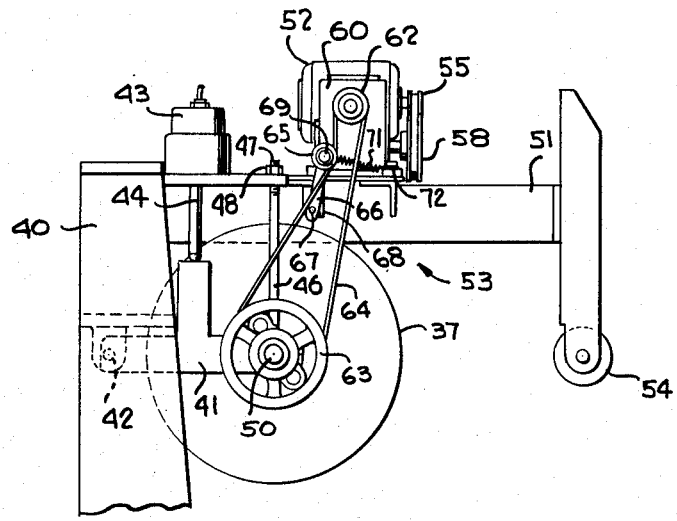
FIGURE 4 is a vertical side elevation view of the drive means for the uppermost hour-glass forming roll, taken on line 4—4 of FIGURE 3.

Referring to the drawings in detail, there is shown a fragmentary portion of a welding machine, generally indicated by the numeral 10, which may be a welding machine of the type disclosed in Patent No. 2,549,173. The welding machine 10 includes an arm 11 which is mounted in cantilever fashion on a base 12 and is of a length which is equal to or greater than the axial length of a cylindrical article to be welded by the machine 10.

Sheet material of the type which is used to form oil drums, for example, is pre-formed into a substantially cylindrical shape and is fed axially along the arm 11 toward a welding station, generally indicated by the numeral 13. An upper electrode roller 14 is mounted on the arm 11 and is rotated by a pivotally mounted driven friction roller 15 that is biased against the electrode roller 14 by a coiled spring 16 that is provided with an adjust bolt 17. Disposed below the upper electrode roller 14, for cooperation therewith, is a lower electrode roller 18 that is driven by a pivotally mounted friction drive roller 19. The drive roller 19 is resiliently biased into engagement with the lower electrode roller 18 by a coiled spring 20 which is provided with an adjusting bolt 21.

The pre-formed sheet material is fed along the arm 11 between a pair of forming rolls 24 and 25 which force adjacent edges of the sheet material against lap guide rollers 26 and 27 by which the edges are correctly lapped, whereupon they are fed between the electrode rollers 14 and 18 for welding. The lower electrode roller 18 is adjustably mounted for vertical sliding adjustment in a pair of fixed slide guides 30 and 31 and is biased upwardly by a fluid motor 32 that includes an adjustably mounted piston rod 33. In the prior art, the electrode rollers 14 and 18, besides functioning as such, were also used as the sole drive means to drive the drum bodies through the welding station 13. In order to prevent slipping of the electrode rollers during the driving of the drum bodies it was necessary to urge the electrode rollers 14 and 18 against each other with considerable force by means of the fluid motor 32. It was also necessary to press the friction drive rollers 15 and 19 against the electrode rollers 14 and 18 respectively with great force by means of the springs 16 and 20.

A plurality of hour-glass forming rolls 35, 36 and 37 are rotatably mounted adjacent to the welding station 13 to cooperate with a drum body (not shown) as the drum body is drawn through the welding station 13 by means of the electrode rollers 14 and 18. The forming rolls 35 and 36 are made up of a plurality of individually rotatable sections, as is shown in FIGURE 3, and are mounted on support arms 38 and 39 such that the axes of the forming rolls 35 and 36 are disposed in downwardly converging relation. The forming rolls 35 and 36 frictionally engage a drum body as it is drawn through the welding station 13 and function as idler rolls.

Figure 5:
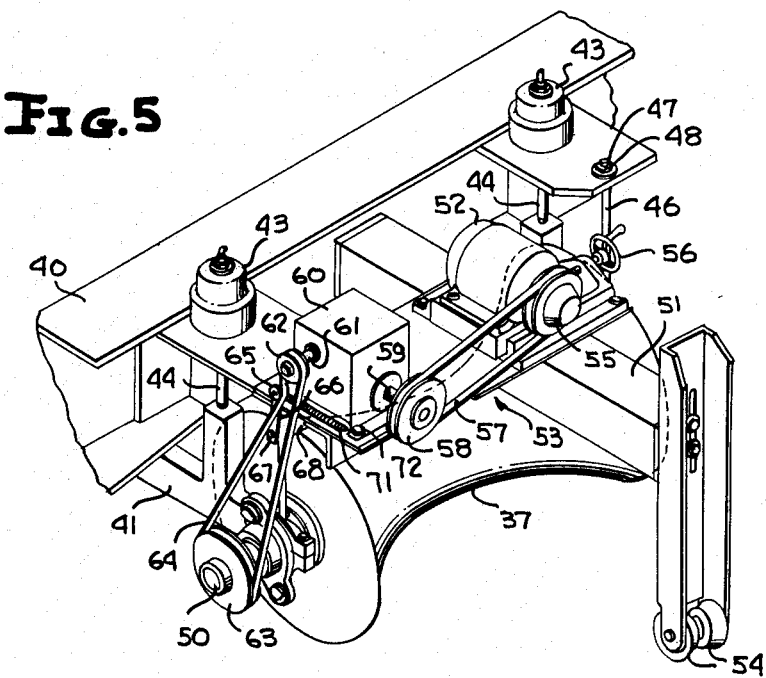
FIGURE 5 is a perspective view of the novel drive means for the forming roll.

The uppermost hour-glass forming roll 37 is pivotally mounted on a supporting frame 40 by a pair of axle support arms 41 that are pivotally mounted on the supporting frame 40 as at 42. The hour-glass forming roll 37 is biased downwardly toward the welding station 13 for engagement with the uppermost surface of the drum which is being drawn through the welding station 13, by a pair of fluid motors 43 which include piston rods 44 that contact the upper surfaces of the axle supporting arms 41. Pivotal movement of the axle support arms 41 is restricted by stop means which includes a pair of travel limiting rods 46 that are screw-threaded at their upper ends 47 and cooperate with internally threaded adjustable collars 48, engageable with the frame bracket structure as shown in FIGURES 1, 3 and 5.

In welding machines that were constructed in accordance with the prior art, it was necessary to exert a large pressure on the uppermost hour-glass forming roll, which forming roll was an idler roll made up of a plurality of individually rotatable sections. The downward pressure on the uppermost forming roll, and the upward pressure on the lower electrode roller combined with necessary high spring pressures on the electrode friction drive rollers, in prior art welding machines, caused rapid wear of the electrode rollers and resulted in large maintenance and replacement expenses.

In accordance with the present invention, the uppermost hour-glass forming roll 37 is of unitary construction, rather than a plurality of individually rotatable sections, and is fixedly secured to an axle 50 for rotation therewith. An arm 51 is fixed to the support frame 40 and supports a constant speed motor 52 which drives the axle 50 and the hour-glass forming roll 37 through a power transmission means, generally indicated by the numeral 53. Arm 51 also supports a pair of adjustably mounted anti-tip up drum guide rolls 54. A conventional variable diameter pulley 55 is connected to the output shaft of the motor 52 and a conventional adjusting wheel 56 is provided for moving the motor 52 which results in the varying of the diameter of the pulley 55. A first drive belt 57 connects the variable diameter pulley 55 to a pulley 58 which is secured to an input shaft 59 of a speed reducer 60. The speed reducer 60, which preferably includes conventional reducing gears, is provided with an output shaft 61 that is integrally connected with a pulley 62. The pulley 62 is operatively connected to a driven pulley 63 that is keyed, or otherwise connected, to the axle 50, by a second belt 64 that extends between the pulleys 62 and 63.

The distance between the axes of the pulleys 62 and 63 varies in accordance with the pivotal movement of the axle support arms 41. Tension is maintained in the second belt 64 by providing a tensioning roller 65. A link 66 is pivotally mounted at 67 to a support block 68 and carries a pin 69 upon which the tension roller 65 is rotatably mounted. A tension spring 71 has one end fixed, as at 72, and has the other end connected to the link 66 to urge the tensioning roller 65 into engagement with the belt 64. Thus, the belt 64 is maintained in tension and slippage between the belt 64 and the pulleys 62 and 63 is avoided.

It is apparent from the foregoing, that a variable speed drive means has been provided for the uppermost hour-glass forming roll 37 wherein the peripheral speed of the hour-glass roll 37 may be varied by changing the effective diameter of the pulley 55. In accordance with this invention, it is preferable that the hour-glass roll 37 be rotated at a net effective peripheral speed that is equal to or slightly greater than the peripheral speed of the driven electrode rollers 14 and 18. Over-feeding of the cylindrical drum, which is being welded, will not occur because the hour-glass roll 37 will easily slip the slight amount of over-speed. Thus, by driving the uppermost hour-glass roll 37, the driving effort of the electrode rollers 14 and 18 is considerably lessened and the pressure on these rollers is very substantially reduced, resulting in longer life for the electrode rollers 14 and 18. Formerly, it was necessary to dress the electrode rollers 14 and 18 for every 2,000 drum bodies; now, it is possible to weld at least 50,000 to 100,000 drum bodies before dressing of the electrode rollers 14 and 18 is required.

While preferred forms and arrangement of parts have been shown in illustrating the invention, it is to be clearly understood that various changes in details and arrangement of parts may be made without departing from the spirit and scope of the invention as defined in the appended claimed subject matter.

I claim:

1. In a drive system for a seam welding machine, a pair of electrode rollers including an upper electrode roller and a lower electrode roller, an hour-glass forming roll mounted adjacent to said electrode rollers, means for resiliently biasing said forming roll toward said electrode rollers, and variable speed drive means operatively connected to said forming roll for driving said forming roll.

2. In a drive system for a seam welding machine, a pair of electrode rollers including an upper electrode roller and a lower electrode roller, an hour-glass forming roll mounted adjacent to said electrode rollers, means for resiliently biasing said forming roll toward said electrode rollers, and variable speed drive means operatively connected to said forming roll for driving said forming roll; said drive means comprising a constant speed motor, a variable diameter pulley, said pulley being drivingly connected to said motor, and power transmission means connecting said pulley to said hour-glass forming roll.

3. In a drive system for a seam welding machine, a pair of electrode rollers including an upper electrode roller and a lower electrode roller, an hour-glass forming roll mounted adjacent to said electrode rollers, means for resiliently biasing said forming roll toward said electrode rollers, and variable speed drive means operatively connected to said forming roll for driving said forming roll; said drive means comprising a constant speed motor, a variable diameter pulley, said pulley being drivingly connected to said motor, and power transmission means connecting said pulley to said hour-glass forming roll; separate drive means operatively connected to said pair of electrode rollers for driving said electrode rollers at a predetermined peripheral speed, said variable speed drive means being adapted to rotate said hour-glass forming roll at a net effective peripheral speed at least equal to said predetermined peripheral speed.

4. An improved seam welding machine of the type comprising a pair of electrode rollers wherein said rollers include an upper roller and a lower roller, the improvement comprising; an hour-glass forming roll, means mounting said forming roll for pivotal movement toward and away from said rollers, and variable speed drive means operatively connected to said forming roll.

5. An improved seam welding machine of the type comprising a pair of electrode rollers wherein said rollers include an upper roller and a lower roller, the improvement comprising; an hour-glass forming roll, means mounting said forming roll for pivotal movement toward and away from said rollers, and variable speed drive means operatively connected to said forming roll; said variable speed drive means comprising a constant speed motor and a speed reducer, a variable diameter pulley operatively connected to said constant speed motor, first belt means operatively connecting said pulley to said speed reducer, second belt means operatively connecting said speed reducer to said hour-glass forming roll, and tensioning means cooperating with said second belt means to compensate for the pivotal movement of said forming roll.

6. A device as defined in claim 5 further characterized in that said tensioning means comprises a tensioning roller, means mounting said tensioning roller in engagement with said second belt means, and spring means urging said tensioning roller against said second belt means to tension said second belt means.

7. In a drive system for a seam welding machine, a pair of electrode rollers including an upper electrode roller and a lower electrode roller, an hour-glass forming roll mounted adjacent to said electrode rollers, means for resiliently biasing said forming roll toward said electrode rollers, said means including a pivotally mounted axle support, an axle rotatably journaled in said axle support, and stop means to limit pivotal movement of said axle support; means connecting said forming roll to said axle for rotation therewith, and drive means operatively connected to said axle for rotating said axle and said forming roll.

8. In the drive system as defined in claim 7 further characterized in that said hour-glass forming roll is of unitary construction.

9. In a drive system for a seam welding machine, a pair of electrode rollers including an inner electrode roller and an outer electrode roller, an hour-glass forming roll mounted adjacent to said electrode rollers, means for urging said forming roll toward said electrode rollers, and independent drive means for said electrode rollers and said forming roll.

10. An improved seam welding machine of the type comprising a pair of electrode rollers wherein said rollers include an inner electrode roller and an outer electrode roller, the improvement comprising; an hour-glass forming roll, means mounting said forming roll for movement toward and away from said electrode rollers, and drive means operatively connected to said forming roll.

References Cited in the file of this patent
UNITED STATES PATENTS

| | | |
|---|---|---|
| 1,915,639 | Woofter | June 27, 1933 |
| 1,920,900 | Sykes | Aug. 1, 1933 |
| 2,009,501 | Kuntze | July 30, 1935 |
| 2,549,173 | Cogan | Apr. 17, 1951 |
| 2,992,318 | La Tour et al. | July 11, 1961 |